United States Patent
Colgrove et al.

(10) Patent No.: US 10,216,447 B1
(45) Date of Patent: *Feb. 26, 2019

(54) OPERATING SYSTEM MANAGEMENT FOR DIRECT FLASH OVER FABRIC STORAGE DEVICES

(71) Applicant: Pure Storage, Inc., Mountain View, CA (US)

(72) Inventors: John Colgrove, Los Altos, CA (US); Peter E. Kirkpatrick, Mountain View, CA (US)

(73) Assignee: PURE STORAGE, INC., Mountain View, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/390,123

(22) Filed: Dec. 23, 2016

Related U.S. Application Data

(63) Continuation of application No. 14/747,842, filed on Jun. 23, 2015, now Pat. No. 9,547,441.

(51) Int. Cl.
   *G06F 3/06* (2006.01)

(52) U.S. Cl.
   CPC .......... *G06F 3/0644* (2013.01); *G06F 3/0604* (2013.01); *G06F 3/0653* (2013.01); *G06F 3/0673* (2013.01)

(58) Field of Classification Search
   CPC .................................................. G06F 12/0246
   See application file for complete search history.

(56) References Cited

U.S. PATENT DOCUMENTS

| | | | |
|---|---|---|---|
| 5,933,598 A | 8/1999 | Scales et al. | |
| 6,286,056 B1 | 9/2001 | Edgar et al. | |
| 6,311,251 B1 * | 10/2001 | Merritt | G06F 3/0608 711/114 |
| 6,643,641 B1 | 11/2003 | Snyder | |
| 6,804,703 B1 | 10/2004 | Allen et al. | |
| 6,954,881 B1 | 10/2005 | Flynn, Jr. et al. | |
| 7,107,389 B2 * | 9/2006 | Inagaki | G06F 12/0246 365/185.01 |
| 7,139,907 B2 | 11/2006 | Bakke et al. | |
| 7,272,674 B1 | 9/2007 | Nandi et al. | |
| 7,313,636 B2 | 12/2007 | Qi | |

(Continued)

OTHER PUBLICATIONS

The International Search Report and the Written Opinion received from the International Searching Authority (ISA/EPO) for International Application No. PCT/US2016/032052, dated Aug. 30, 2016, 17 pages.

(Continued)

*Primary Examiner* — Ryan Bertram
*Assistant Examiner* — Edmund H Kwong
(74) *Attorney, Agent, or Firm* — Womble Bond Dickinson (US) LLP; Daniel E. Ovanezian

(57) ABSTRACT

Exposing a geometry of a storage device, including: sending, by the storage device, information describing the layout of memory in the storage device; receiving, by the storage device, a write request, the write request associated with an amount of data sized in dependence upon the layout of memory in the storage device; and writing, by the storage device, the data to a memory unit, the data written to a location within the memory unit in dependence upon the layout of memory in the storage device.

18 Claims, 7 Drawing Sheets

(56) References Cited

U.S. PATENT DOCUMENTS

| | | | |
|---|---|---|---|
| 7,437,530 | B1 | 10/2008 | Rajan |
| 7,577,802 | B1 | 8/2009 | Parsons |
| 8,103,754 | B1 | 1/2012 | Luong et al. |
| 8,301,811 | B1 | 10/2012 | Wigmore et al. |
| 8,429,326 | B2 * | 4/2013 | Chua ............... G11C 16/20 711/101 |
| 8,645,649 | B2 | 2/2014 | Kaiya et al. |
| 8,812,860 | B1 | 8/2014 | Bray |
| 8,909,854 | B2 * | 12/2014 | Yamagishi ......... G06F 13/16 711/100 |
| 9,063,937 | B2 | 6/2015 | McDowell et al. |
| 9,134,922 | B2 | 9/2015 | Rajagopal et al. |
| 9,294,567 | B2 | 3/2016 | Hussain et al. |
| 9,430,412 | B2 | 8/2016 | Huang |
| 9,501,245 | B2 | 11/2016 | Hussain et al. |
| 9,565,269 | B2 | 2/2017 | Malwankar et al. |
| 2006/0239075 | A1 | 10/2006 | Williams et al. |
| 2007/0109856 | A1 | 5/2007 | Pellicone et al. |
| 2008/0034167 | A1 | 2/2008 | Sharma et al. |
| 2008/0282045 | A1 | 11/2008 | Biswas et al. |
| 2010/0325345 | A1 * | 12/2010 | Ohno ............... G06F 11/108 711/103 |
| 2011/0125955 | A1 | 5/2011 | Chen |
| 2011/0131231 | A1 | 6/2011 | Haas et al. |
| 2013/0290607 | A1 | 10/2013 | Chang et al. |
| 2015/0019798 | A1 | 1/2015 | Huang |
| 2015/0378888 | A1 | 12/2015 | Zhang et al. |
| 2017/0024166 | A1 | 1/2017 | Singh et al. |

OTHER PUBLICATIONS

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-McIntyre et al., "OpenID and the EnterpriseL A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

Ouyang, J. et al. (Mar. 1-5, 2014) "SDF: Software-Defined Flash for Web-Scale Internet Storage Systems", ASPLOS 2014, 14 pages.

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

OPERATING SYSTEM MANAGEMENT FOR DIRECT FLASH OVER FABRIC STORAGE DEVICES

CROSS-REFERENCE TO RELATED APPLICATION

This application is a continuation application of and claims priority from U.S. patent application Ser. No. 14/747,842, filed Jun. 23, 2015.

BACKGROUND

Field of Technology

The field of technology is methods, apparatuses, and products for exposing a geometry of a storage device.

Description of Related Art

Enterprise storage systems can provide large amounts of computer storage to modern enterprises. The performance of such storage systems, which is frequently measured in terms of throughput and latency, may be reduced as the storage devices may be required to perform operations other than servicing input/output ('I/O') operations.

SUMMARY

Methods, apparatus, and products for exposing a geometry of a storage device, including: sending, by the storage device, information describing the layout of memory in the storage device; receiving, by the storage device, a write request, the write request associated with an amount of data sized in dependence upon the layout of memory in the storage device; and writing, by the storage device, the data to a memory unit, the data written to a location within the memory unit in dependence upon the layout of memory in the storage device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
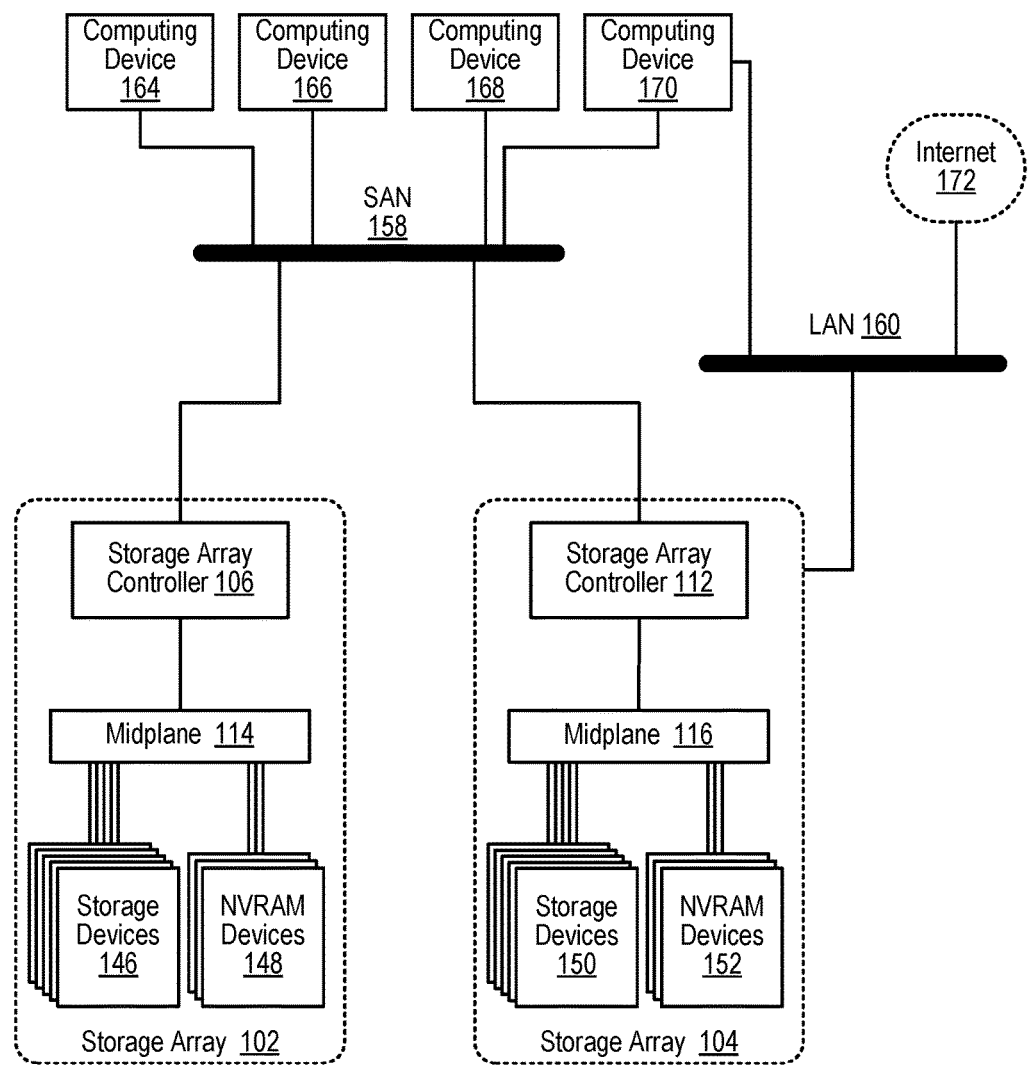
FIG. 1 sets forth a block diagram of a system configured for exposing a geometry of a storage device according to embodiments of the present disclosure.

Example methods, apparatuses, and products for exposing a geometry of a storage device in accordance with the present disclosure are described with reference to the accompanying drawings, beginning with FIG. 1. FIG. 1 sets forth a block diagram of a system configured for exposing a geometry of a storage device according to embodiments of the present disclosure. The system of FIG. 1 includes a plurality of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached SCSI ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), and so on.

The example storage arrays (102, 104) of FIG. 1 provide persistent data storage for the computing devices (164, 166, 168, 170). Each storage array (102, 104) depicted in FIG. 1 includes one or more storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives ('RAID') or RAID-like data redundancy operations, compressing data, encrypting data, and so on.

Each storage array controller (106, 112) may be implemented in a variety of ways, including as an Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of NVRAM devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices (146, 150). In this way, the latency of write requests may be significantly improved relative to a system in which the storage array controller writes data directly to the storage devices (146, 150).

The NVRAM devices may be implemented with computer memory in the form of high bandwidth, low latency DRAM. In such an embodiment, each NVRAM device is referred to as 'non-volatile' because each NVRAM device may receive or include a unique power source that maintains the state of the DRAM after main power loss to the NVRAM device (148, 152). Such a power source may be a battery, one or more capacitors, or the like. During the power loss, the NVRAM device (148, 152) may be configured to write the contents of the DRAM to a persistent storage, such as flash memory contained within the NVRAM device (148, 152). Such flash memory that is contained within the NVRAM device (148, 152) may be embodied, for example, as one or more non-volatile dual-inline memory modules ('NVDIMMs').

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

In the example depicted in FIG. 1, each of the storage devices (146, 150) may be configured to expose its geometry to one or more of the storage array controllers (106, 112) by sending information describing the layout of memory in the storage device (146, 150), receiving a write request associated with an amount of data sized in dependence upon the layout of memory in the storage device (146, 150), and writing the data to a location within the memory unit in dependence upon the layout of memory in the storage device (146, 150), as described in greater detail below. In the example of FIG. 1, sending information describing the layout of memory in the storage device (146, 150), receiving a write request associated with an amount of data sized in dependence upon the layout of memory in the storage device (146, 150), and writing the data to a location within the memory unit in dependence upon the layout of memory in the storage device (146, 150) may be carried out, for example, by an embedded microcontroller or other digital circuitry included in the storage device (146, 150).

The storage array controllers (106, 112) of FIG. 1 may be useful for aligning memory access operations to a geometry of a storage device (146, 150) according to embodiments of the present disclosure. The storage array controllers (106, 112) may be useful for aligning memory access operations to a geometry of a storage device (146, 150) by receiving information describing the layout of memory in the storage device (146, 150), determining a write size in dependence upon the layout of memory in the storage device (146, 150), and sending a write request addressed to a location within the memory unit in dependence upon the layout of memory in the storage device (146, 150), as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Exposing a geometry of a storage device in accordance with embodiments of the present disclosure is generally implemented with computers. In the system of FIG. 1, for example, all the computing devices (164, 166, 168, 170) and storage controllers (106, 112) may be implemented, to some extent at least, as computers. For further explanation, FIG. 2 therefore sets forth a block diagram of a storage array controller (202) useful for exposing a geometry of a storage device according to embodiments of the present disclosure.

Figure 2:
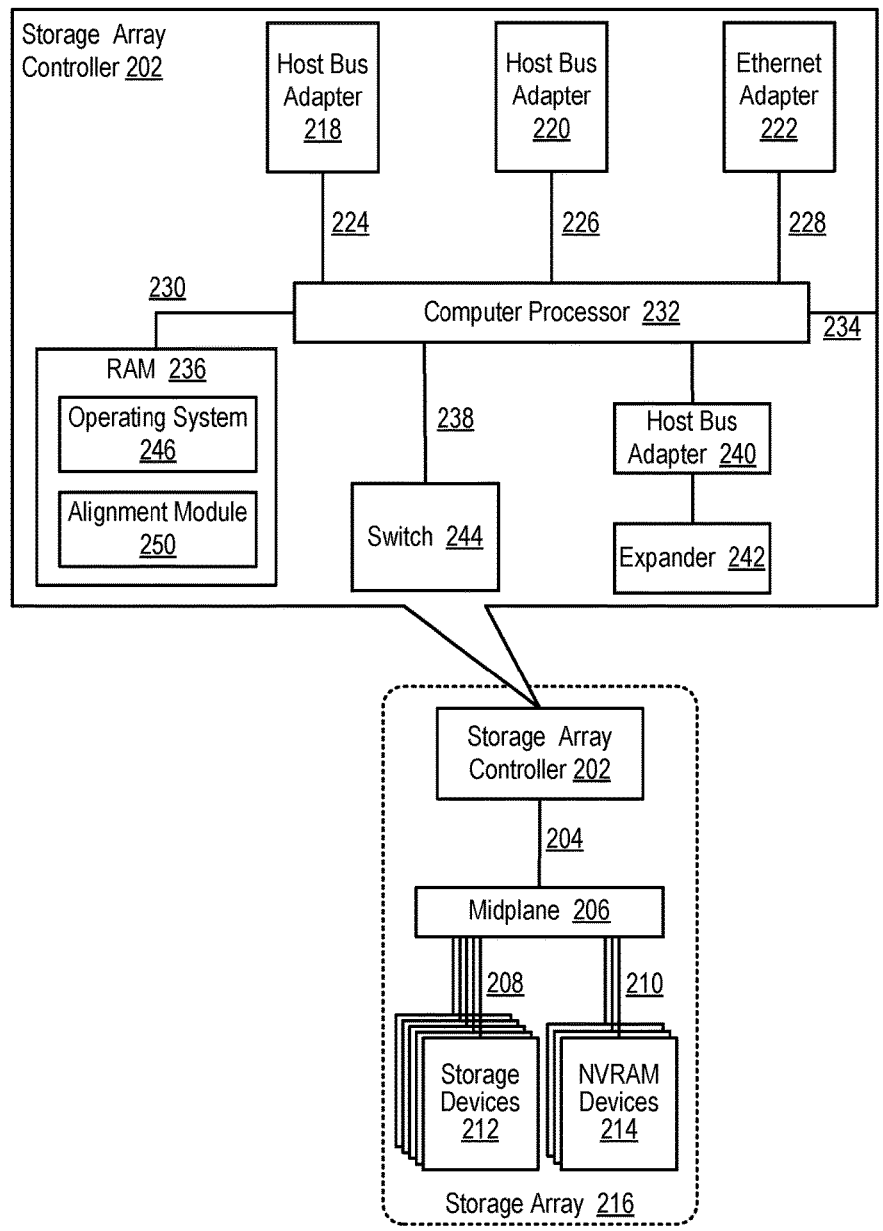
FIG. 2 sets forth a block diagram of a storage array controller useful in exposing a geometry of a storage device according to embodiments of the present disclosure.

The storage array controller (202) of FIG. 2 is similar to the storage array controllers depicted in FIG. 1. For example, the storage array controller (202) of FIG. 2 is also communicatively coupled, via a midplane (206), to one or more storage devices (212) and also to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as RAM (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for buffering data to be written to an array of non-volatile storage devices according to embodiments of the present disclosure include UNIX™, Linux™, Microsoft Windows™, and others as will occur to those of skill in the art. The operating system (246) in the example of FIG. 2 is shown in RAM (168), but many components of such software may be stored in non-volatile memory such as a disk drive, an SSD, and so on.

Also stored in RAM (214) is an alignment module (250), a module of computer program instructions for aligning memory access operations to a geometry of a storage device according to embodiments of the present disclosure. The geometry of the storage device may be defined by various characteristics of the storage device such as, for example, the size of various memory units such as a page, a block, and so on. For example, the geometry of the storage device may be such that a page is 16 KB in size and that a block includes 512 pages, such that the total block size is 8 MB.

The alignment module (250) may be configured for aligning memory access operations to a geometry of a storage device by receiving information describing the layout of memory in the storage device. The storage array controller (202) may receive the information describing the layout of memory in the storage device, for example, via a midplane and one or more data communications links as described above with reference to FIG. 1. Such information can include information describing the size of various memory units such as a page, a block, or other memory unit within the storage device. The information can also include, for example, information describing the number of blocks in the storage device, information describing any pages or blocks that are reserved for a specific purpose (e.g., storing boot code for a device) and are therefore unavailable for general purpose use, and any other information useful in describing the layout of memory in the storage device.

The alignment module (250) may be configured for aligning memory access operations to a geometry of a storage device by determining a write size in dependence upon the layout of memory in the storage device. The storage array controller (202) may determine a write size in dependence upon the layout of memory in the storage device, for example, by examining the information describing the layout of memory in the storage device to identify the smallest writeable memory unit in the storage device. The smallest writeable memory unit in the storage device may be embodied, for example, as the smallest unit within a storage device that may be written to when executing a single write operation. For example, the smallest writeable memory unit in the storage device may be embodied as a 16 KB page. In the example method depicted in FIG. 4, the size of a writeable memory unit in the storage device may be different than the size of an erasable memory unit in the storage device. For example, a single write operation may write data to a single 16 KB page while a single erase operation may only erase memory as a single 8 MB block. In such an example, the storage array controller (202) may be configured such that when the storage array controller (202) receives a request to write data in excess of 16 KB from a computing device (164, 166, 168, 170 of FIG. 1) that has access to the storage array (102, 104 of FIG. 1), the storage array controller (202) can break up the data into multiple, non-overlapping 16 KB units. In such a way, the storage array controller (202) may service a request to write data in excess of 16 KB by issuing a distinct write request to write each of the 16 KB unit to a different page of the storage device.

The alignment module (250) may be configured for aligning memory access operations to a geometry of a storage device by sending, to the storage device, a write request addressed to a location within a memory unit in dependence upon the layout of memory in the storage device. The storage array controller (202) of FIG. 2 may be configured, for example, to write data to unused portions of a first erasable memory unit until the first erasable memory unit contains no unused portions. Once the first erasable memory unit contains no unused portions, the storage array controller (202) may be configured to identify a second erasable memory unit and write data to unused portions of the second erasable memory unit until the second erasable memory unit contains no unused portions. In such an example, sending a write request addressed to a location within the memory unit in dependence upon the layout of memory in the storage device may be carried out by the storage array controller (202) receiving information describing the size of a single erasable memory unit and the storage array controller (202) tracking which portions of the single erasable memory unit data has been written to, as well as tracking which portions of the single erasable memory unit are unused. In such a way, the storage array controller (202) may be configured to issue write requests to contiguous unused portions a single erasable memory unit, until data has been written to all portions of the single erasable memory unit.

Consider the example described above in which data may be written to the storage device as a single 16 KB page while data may only be erased from the storage device as a single 8 MB block. In such an example, the storage array controller (202) may be configured to issue requests to write data to contiguous locations (e.g., pages) within a particular 8 MB block until the block includes no unused portions. In such an example, once the particular 8 MB block includes no unused portions, the storage array controller (202) may be configured to issue requests to write data to contiguous locations within a new 8 MB block until the new block includes no unused portions.

Readers will appreciate that in alternative embodiments, data may be written to unused portions of a multiple erasable memory units in parallel. In such an embodiment, the storage array controller (202) of FIG. 2 may be configured to write data to an unused portion of a first erasable memory unit, an unused portion of a second erasable memory unit, an unused portion of a third erasable memory unit, and so on in parallel. The storage array controller (202) of FIG. 2 may have a predetermined set of memory units that may be utilized in parallel, such that the storage array controller (202) may be writing data to each memory unit in the set simultaneously.

Continuing with the example described above in which data may be written to the storage device as a single 16 KB page while data may only be erased from the storage device as a single 8 MB block, assume that one hundred 8 MB blocks are available for simultaneous use by the storage array controller (202). In such an example, the storage array controller (202) may be configured to issue a request to write data to contiguous locations (e.g., pages) within each of the one hundred 8 MB blocks in parallel. For example, if the storage array controller is attempting to write data that is one hundred pages in size, the storage array controller (202) may be configured to simultaneously issue a request to write the first 16 KB of the data to a first unused page in the first 8 MB block, issue a request to write the second 16 KB of the data to a first unused page in the second 8 MB block, issue a request to write the third 16 KB of the data to a first unused page in the third 8 MB block, and so on. In such a way, the storage array controller (202) achieve performance benefits by writing to multiple blocks in parallel, rather than writing only to a single block.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each host bus adapter (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each host bus adapter (218, 220, 222) may be coupled to the computer processor (232) via a data communications link (224, 226, 228) such as, for example, a PCIe bus.

The storage array controller (202) of FIG. 2 also includes a switch (244) that is coupled to the computer processor (232) via a data communications link (238). The switch (244) of FIG. 2 may be embodied as a computer hardware device that can create multiple ports out of a single port, thereby enabling multiple devices to share what was initially a single port. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a host bus adapter (240) that is coupled to an expander (242). The expander (242) depicted in FIG. 2 may be embodied, for example, as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller. In alternative embodiment, the combination of a host bus adapter (240) and expander (242) may be replaced by a PCIe switch as described in the preceding paragraph.

The storage array controller (202) of FIG. 2 also includes a data communications link (234) for coupling the storage array controller (202) to other storage array controllers. Such a data communications link (234) may be embodied, for example, as a PCIe Non-Transparent Bridge ('NTB'), a QuickPath Interconnect ('QPI') interconnect, and so on. Readers will appreciate, however, that such a data communications link (234) may be embodied using other interconnects and protocols in accordance with embodiments described herein.

Readers will recognize that these components, protocols, adapters, and architectures are for illustration only, not limitation. Such a storage array controller may be implemented in a variety of different ways, each of which is well within the scope of the present disclosure.

Figure 3:
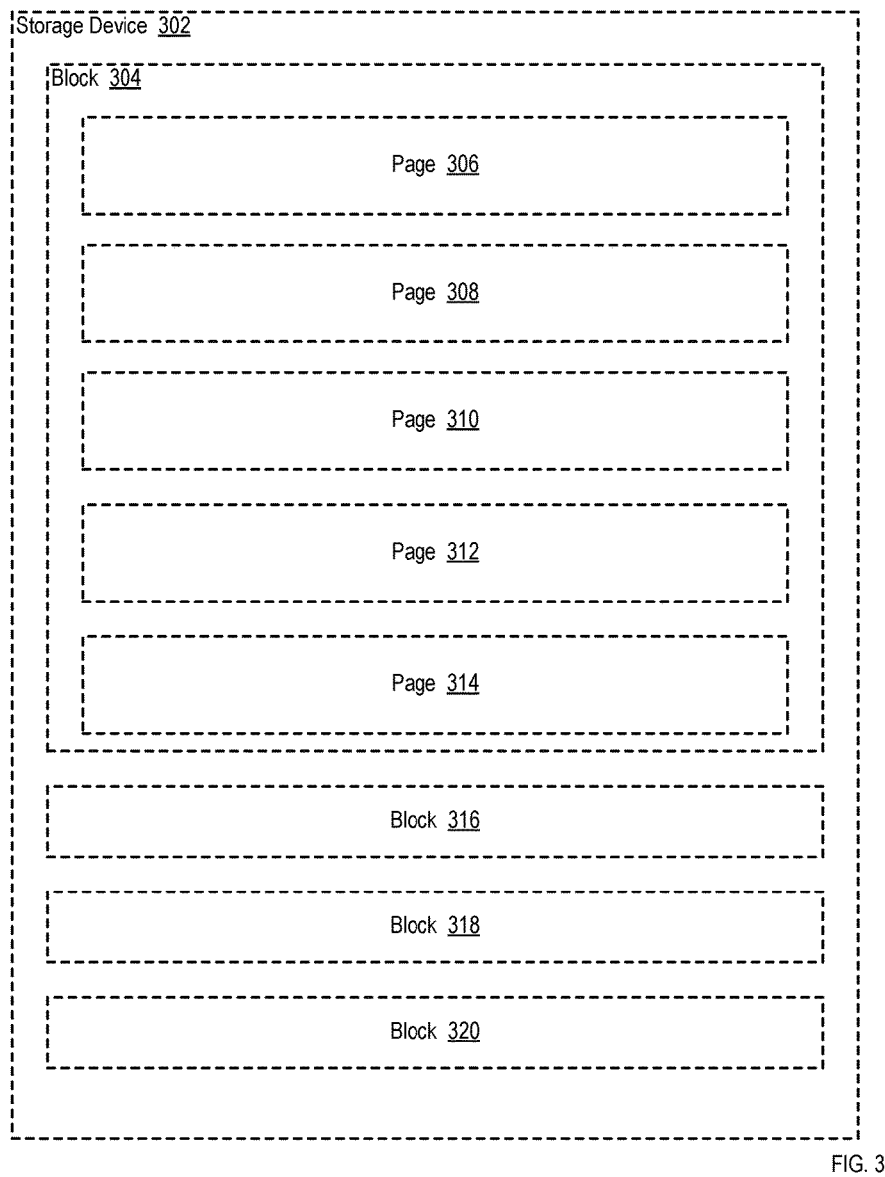
FIG. 3 sets forth a block diagram of a storage device according to embodiments of the present disclosure.

For further explanation, FIG. 3 sets forth a block diagram of a storage device (302) according to embodiments of the present disclosure. The example storage device (302) depicted in FIG. 3 includes a plurality of memory blocks (304, 316, 318, 320), each of which include a plurality of pages (306, 308, 310, 312, 314). Each page (306, 308, 310, 312, 314) may be of a predetermined size such as, for example, 16 KB. In such an example, each page (306, 308, 310, 312, 314) may represent the unit of memory that can be used to service a single write operation. That is, executing a single write operation may cause 16 KB of data (or less) to be written to a single page (306, 308, 310, 312, 314). Each block (304, 316, 318, 320) may be of a predetermined size such as, for example, 8 MB. Each block (304, 316, 318, 320) may therefore include a predetermined number of pages (306, 308, 310, 312, 314). In such an example, each block (304, 316, 318, 320) may represent the unit of memory that is erased by executing a single erase operation. That is, a single erase operation may erase all 8 MB of a particular block (304, 316, 318, 320). In such an example, the amount of data written by performing a single write operation is therefore different than the amount of data erased by performing a single erase operation.

Figure 4:
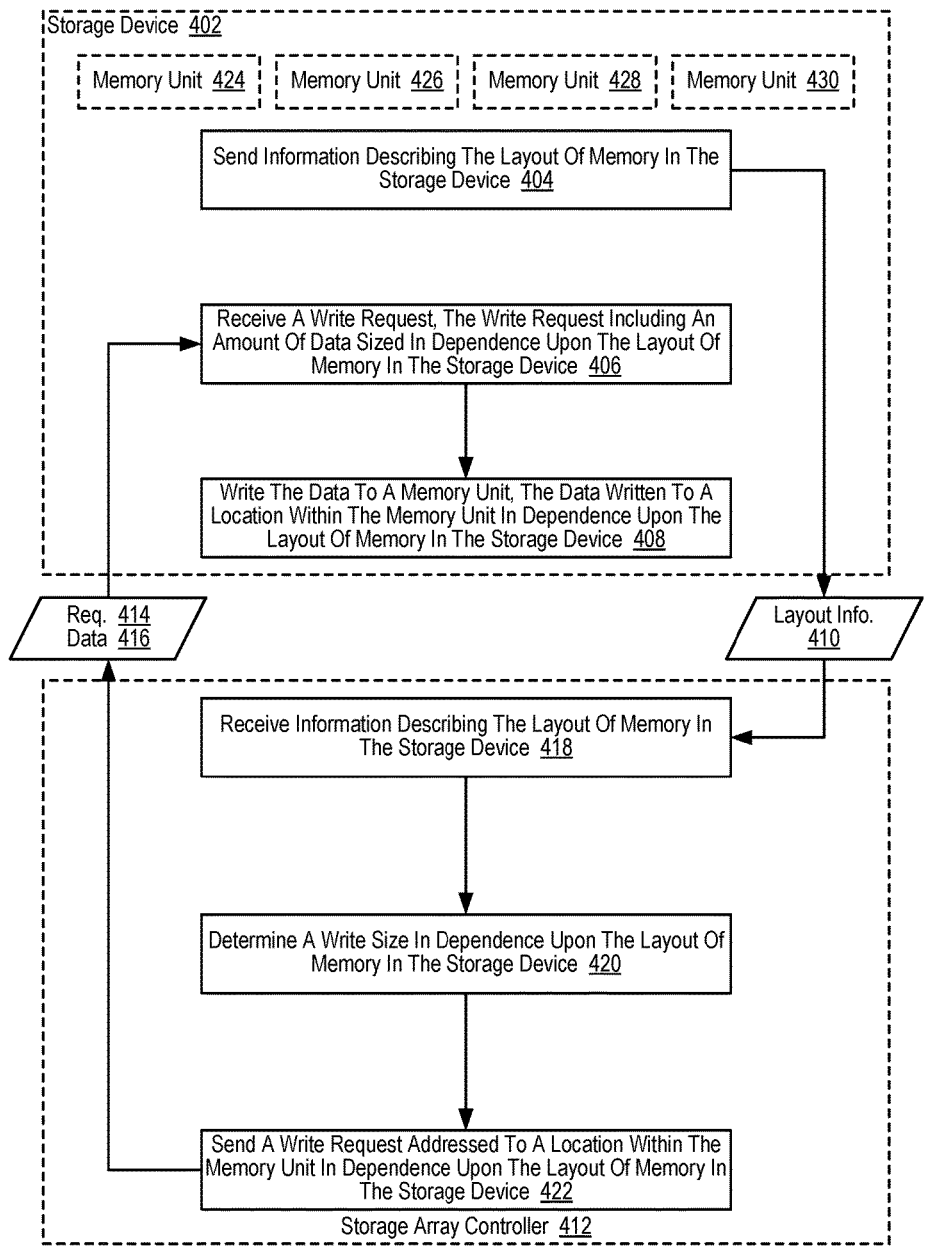
FIG. 4 sets forth a flow chart illustrating an example method of exposing a geometry of a storage device according to embodiments of the present disclosure.

For further explanation, FIG. 4 sets forth a flow chart illustrating an example method of aligning memory access operations to a geometry of a storage device (402) according to embodiments of the present disclosure. The geometry of the storage device (402) may be defined by various characteristics of the storage device (402) such as, for example, the size of various memory units (424, 426, 428, 430) such as a page, a block, and so on. For example, the geometry of the storage device (402) may be such that a page is 16 KB in size and that a block includes 512 pages, such that the total block size is 8 MB.

The example method depicted in FIG. 4 includes sending (404), by the storage device (402), information (410) describing the layout of memory in the storage device (402). The storage device (402) may send (404) information (410) describing the layout of memory in the storage device (402), for example, to a storage array controller (412) via a midplane and one or more data communications links as described above with reference to FIG. 1. Such information (410) can include information describing the size of various memory units (424, 426, 428, 430) such as a page, a block, or other memory unit (424, 426, 428, 430) within the storage device (402). The information (410) can also include, for example, information describing the number of blocks in the storage device (402), information describing any pages or blocks that are reserved for a specific purpose (e.g., storing boot code for a device) and are therefore unavailable for general purpose use, and any other information useful in describing the layout of memory in the storage device (402).

The information (410) describing the layout of memory in the storage device (402) may be sent (404) from the storage device (402) via one or more messages that may include information such as an identifier of the storage device (402), the layout information (410) itself, and any other necessary information. In the example method depicted in FIG. 4, the information (410) describing the layout of memory in the storage device (402) may be sent (404) by the storage device (402) in response to a request for such information (410), periodically upon the expiration of a predetermined period of time, in response to an indication that the storage array controller (412) is booting up, or in response to any other triggering event.

The example method depicted in FIG. 4 also includes receiving (418), by the storage array controller (412), the information (410) describing the layout of memory in the storage device (402). The storage array controller (412) may receive (418) the information (410) describing the layout of memory in the storage device (402), for example, via a midplane and one or more data communications links as described above with reference to FIG. 1. The information (410) describing the layout of memory in the storage device (402) may be received (418) via one or more messages that may include information such as an identifier of the storage device (402), the layout information (410) itself, and any other information useful in describing the layout of memory in the storage device (402).

The example method depicted in FIG. 4 also includes determining (420), by the storage array controller (412), a write size in dependence upon the layout of memory in the storage device (402). The storage array controller (412) may determine (420) a write size in dependence upon the layout of memory in the storage device (402), for example, by examining the information (410) describing the layout of memory in the storage device (402) to identify the smallest writeable memory unit in the storage device (402). The smallest writeable memory unit in the storage device (402) may be embodied, for example, as the smallest unit within a storage device (402) that may be written to when executing a single write operation. For example, the smallest writeable memory unit in the storage device (402) may be embodied as a 16 KB page. In the example method depicted in FIG. 4, the size of a writeable memory unit in the storage device (402) may be different than the size of an erasable memory unit in the storage device (402). For example, a single write operation may write data to a single 16 KB page while a single erase operation may only erase memory as a single 8 MB block. In such an example, the storage array controller (412) may be configured such that when the storage array controller (412) receives a request to write data in excess of 16 KB from a computing device (164, 166, 168, 170 of FIG. 1) that has access to the storage array (102, 104 of FIG. 1), the storage array controller (412) can break up the data into multiple, non-overlapping 16 KB units. In such a way, the storage array controller (412) may service a request to write data in excess of 16 KB by issuing a distinct write request to write each of the 16 KB units to a different page of the storage device (402).

The example method depicted in FIG. 4 also includes sending (422), from the storage array controller (412) to the storage device (402), a write request (414) addressed to a location within a memory unit (424, 426, 428, 430) in dependence upon the layout of memory in the storage device (402). The storage array controller (412) of FIG. 4 may be configured, for example, to issue write requests directed to unused portions of a first erasable memory unit until the first erasable memory unit contains no unused portions. Once the first erasable memory unit contains no unused portions, the storage array controller (412) may be configured to identify a second erasable memory unit and issue write requests directed to unused portions of the second erasable memory unit until the second erasable memory unit contains no unused portions. In such an example, sending (422) a write request (414) addressed to a location within the memory unit in dependence upon the layout of memory in the storage device (402) may be carried out by the storage array controller (412) receiving information describing the size of a single erasable memory unit and the storage array controller (412) tracking which portions of the single erasable memory unit data has been written to, as well as tracking which portions of the single erasable memory unit are unused. In such a way, the storage array controller (412) may be configured to issue write requests to contiguous unused portions a single erasable memory unit, until data has been written to all portions of the single erasable memory unit.

Consider the example described above in which data may be written to the storage device (402) as a single 16 KB page while data may only be erased from the storage device (402) as a single 8 MB block. In such an example, the storage array controller (412) may be configured to issue requests to write data to contiguous locations within a particular 8 MB block until the block includes no unused portions. In such an example, once the particular 8 MB block includes no unused portions, the storage array controller (412) may be configured to issue requests to write data to contiguous locations within a new 8 MB block until the new block includes no unused portions.

The example method depicted in FIG. 4 also includes receiving (406), by the storage device (402), the write request (414). The write request (414) may be received (406) by the storage device (402), for example, from the storage array controller (412) via a midplane and one or more data communications links as described above with reference to FIG. 1. In the example method depicted in FIG. 4, the write request (414) is associated with an amount of data (416) that is sized in dependence upon the layout of memory in the storage device (402). That is, the write request (414) may include a request to write an amount of data (416) of a size that is selected in dependence upon the layout of memory in the storage device (402). Consider the example described above in which data may be written to the storage device (402) as a single 16 KB page while data may only be erased from the storage device (402) as a single 8 MB block. In such an example, each write request (414) received (406) by the storage device (402) may include a request to write 16 KB of data to the storage device (402).

The example method depicted in FIG. 4 also includes writing (408), by the storage device (402), the data (416) to a memory unit (424, 426, 428, 430). Each memory unit (424, 426, 428, 430) may be embodied, for example, as a page in the storage device (402), as a block in the storage device (402), and so on. In the example method depicted in FIG. 4, the data (416) is written (408) to a location within the memory unit (424, 426, 428, 430) in dependence upon the layout of memory in the storage device (402). Such a location within the memory unit (424, 426, 428, 430) may be selected by the storage array controller (412) in dependence upon the layout of memory in the storage device (402), and included in the write request (414) received by the storage device (402).

Figure 5:
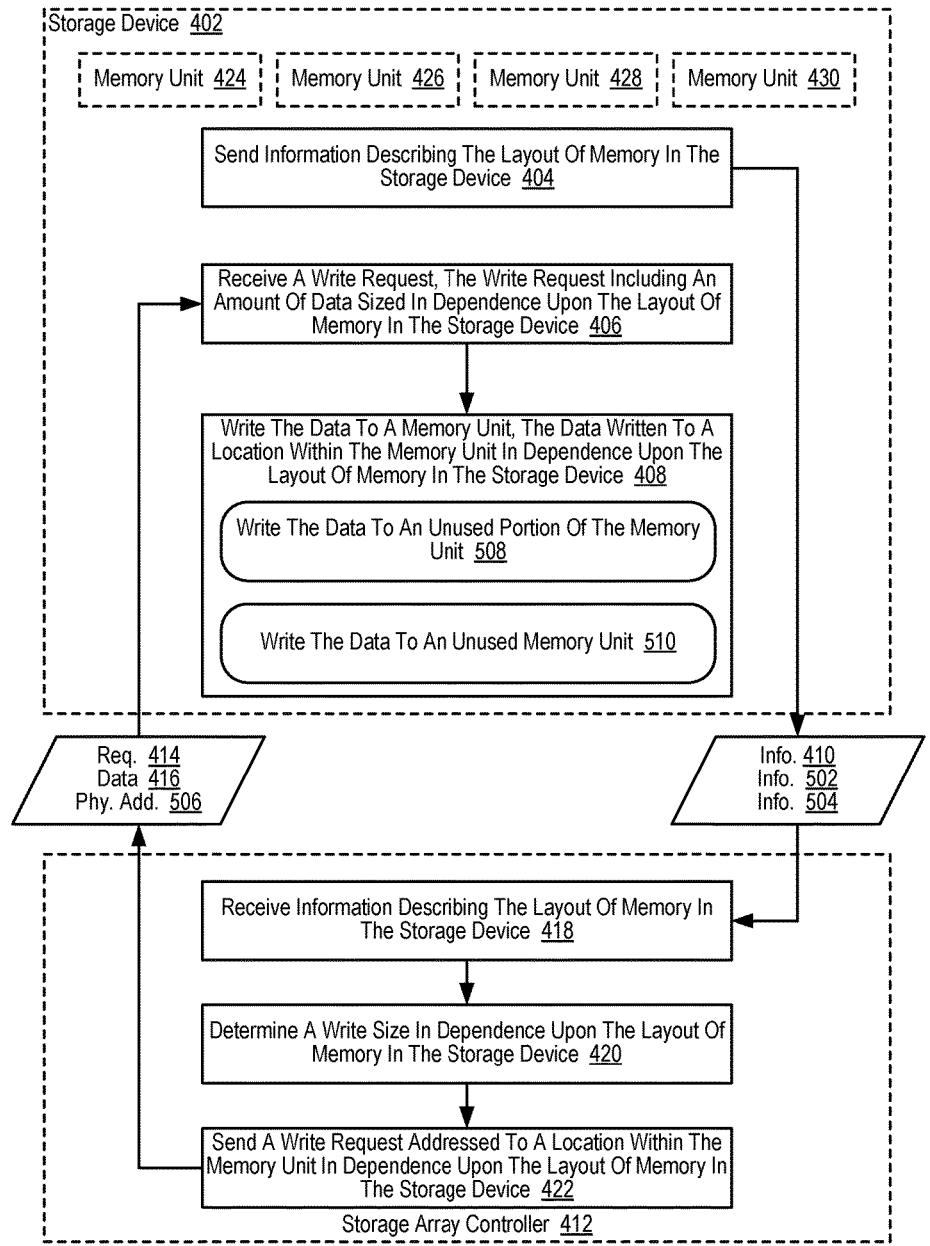
FIG. 5 sets forth a flow chart illustrating an additional example method of exposing a geometry of a storage device according to embodiments of the present disclosure.

For further explanation, FIG. 5 sets forth a flow chart illustrating an additional example method of exposing a geometry of a storage device (402) according to embodiments of the present disclosure. The example method depicted in FIG. 5 is similar to the example method depicted in FIG. 4, as the example method depicted in FIG. 5 also includes sending (404) information (410) describing the layout of memory in the storage device (402), receiving (418) the information (410) describing the layout of memory in the storage device (402), determining (420) a write size in dependence upon the layout of memory in the storage device (402), sending (422) a write request (414) addressed to a location within a memory unit (424, 426, 428, 430) in dependence upon the layout of memory in the storage device (402), receiving (406) the write request (414), and writing (408) the data (416) to a memory unit (424, 426, 428, 430) in dependence upon the layout of memory in the storage device (402).

In the example method depicted in FIG. 5, the write request (414) includes a physical address (506) of a location in the storage device (402) for storing the data. The physical address (506) of FIG. 5 may be embodied, for example, a value that refers to a particular memory location in the storage device (402) for the entire life of the storage device (402). The physical address (506) of FIG. 5 is distinguished from a virtual address, as a particular physical address (506) will always refer to the same memory location during the life of the storage device (402) and no translation of the particular physical address (506) is required to identify the particular memory location associated with the particular physical address (506). In such an example, the storage array controller (412) may be able to include the physical address (506) in the write request (414), for example, by receiving information describing a physical addressing scheme in the information (410) describing the layout of memory in the storage device (402) and maintaining a page table or other data structure for performing address translation. In such a way, the storage array controller (412) can be configured to send memory access requests (e.g., read, write, erase) to the storage device (402), without requiring the storage device (402) to perform address translation operations in order to service the memory access requests.

In the example method depicted in FIG. 5, the information (410) describing the layout of memory in the storage device (402) includes information (502) describing a size of a writeable memory unit in the storage device (402). The writeable memory unit in the storage device (402) may be embodied, for example, as the smallest unit within a storage device (402) that data may be written to when executing a single write operation. The smallest writeable memory unit in the storage device (402) may be embodied as a 16 KB page, such that two write operations cannot be directed to the same 16 KB page without overwriting (via an erase and program cycle) data written to the 16 KB page by the first write operation.

In the example method depicted in FIG. 5, the information (410) describing the layout of memory in the storage device (402) includes information (504) describing a size of an erasable memory unit in the storage device (402). The erasable memory unit in the storage device (402) may be embodied, for example, as the smallest unit within a storage device (402) that is erased when executing a single erase operation. For example, the erasable memory unit may be embodied as an 8 MB block. In such an example, when a single erase command is executed, the entire 8 MB block is erased and all data stored in the 8 MB block is lost, unless such data is rewritten elsewhere prior to executing the erase command.

In the example method depicted in FIG. 5, writing (408) the data (416) to a memory unit (424, 426, 428, 430) in dependence upon the layout of memory in the storage device (402) can alternatively include writing (508) the data to an unused portion of the memory unit (424, 426, 428, 430). The unused portions of the memory unit (424, 426, 428, 430) may be embodied, for example, as empty pages within a block. For example, an 8 MB block may only include data stored in the pages that comprise the first 3 MB of the block, meaning that no data is stored in the pages that comprise the last 5 MB of the block. In such an example, writing (508) the data to an unused portion of the memory unit (424, 426, 428, 430) may therefore be carried out by writing data to some portion of the pages that comprise the last 5 MB of the block.

In the example method depicted in FIG. 5, writing (408) the data (416) to a memory unit (424, 426, 428, 430) in dependence upon the layout of memory in the storage device (402) can alternatively include writing (510) the data to an unused memory unit (424, 426, 428, 430). The unused memory unit (424, 426, 428, 430) may be embodied, for example, as an entire empty block. For example, an 8 MB block may have been recently subjected to an erase operation, meaning that no data is stored in the entire 8 MB block. In such an example, writing (510) the data to an unused memory unit (424, 426, 428, 430) may therefore be carried out by writing data to one or more pages within the block.

Figure 6:
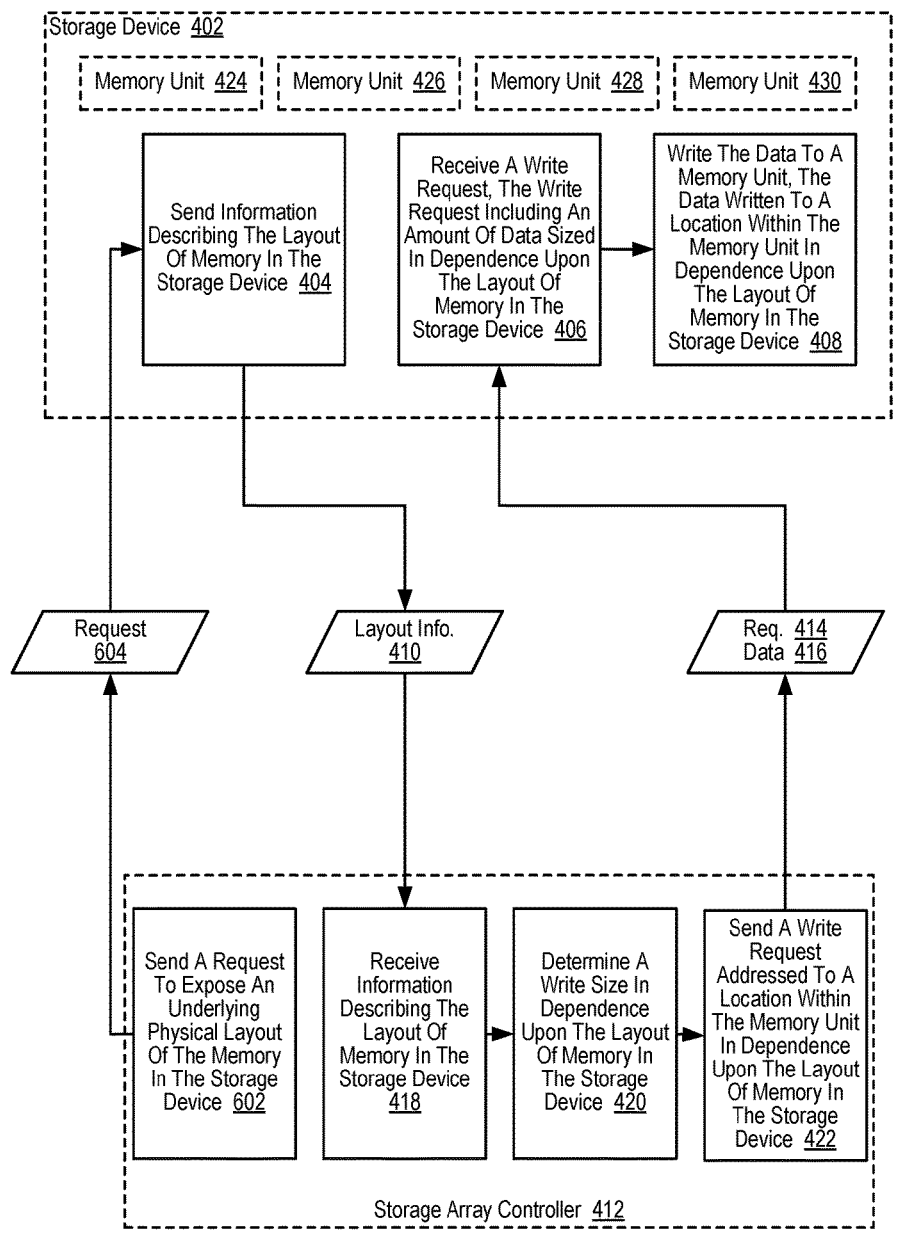
FIG. 6 sets forth a flow chart illustrating an additional example method of exposing a geometry of a storage device according to embodiments of the present disclosure.

For further explanation, FIG. 6 sets forth a flow chart illustrating an additional example method of exposing a geometry of a storage device (402) according to embodiments of the present disclosure. The example method depicted in FIG. 6 is similar to the example method depicted in FIG. 4, as the example method depicted in FIG. 6 also includes sending (404) information (410) describing the layout of memory in the storage device (402), receiving (418) the information (410) describing the layout of memory in the storage device (402), determining (420) a write size in dependence upon the layout of memory in the storage device (402), sending (422) a write request (414) addressed to a location within a memory unit (424, 426, 428, 430) in dependence upon the layout of memory in the storage device (402), receiving (406) the write request (414), and writing (408) the data (416) to a memory unit (424, 426, 428, 430) in dependence upon the layout of memory in the storage device (402).

The example method depicted in FIG. 6 also includes sending (602), by the storage array controller (412), a request (604) to expose an underlying physical layout of the memory in the storage device (402). The request (604) to expose the underlying physical layout of the memory in the storage device (402) may be sent (602) from the storage array controller (412) to the storage device (402) via a midplane and one or more data communications links as described above with reference to FIG. 1. The storage array controller (412) may send (602) the request (604) to the storage device (402), for example, when the storage array controller (412) is booted, in response to detecting that the storage device (402) has been powered up or otherwise added to the storage array, and so on.

Figure 7:
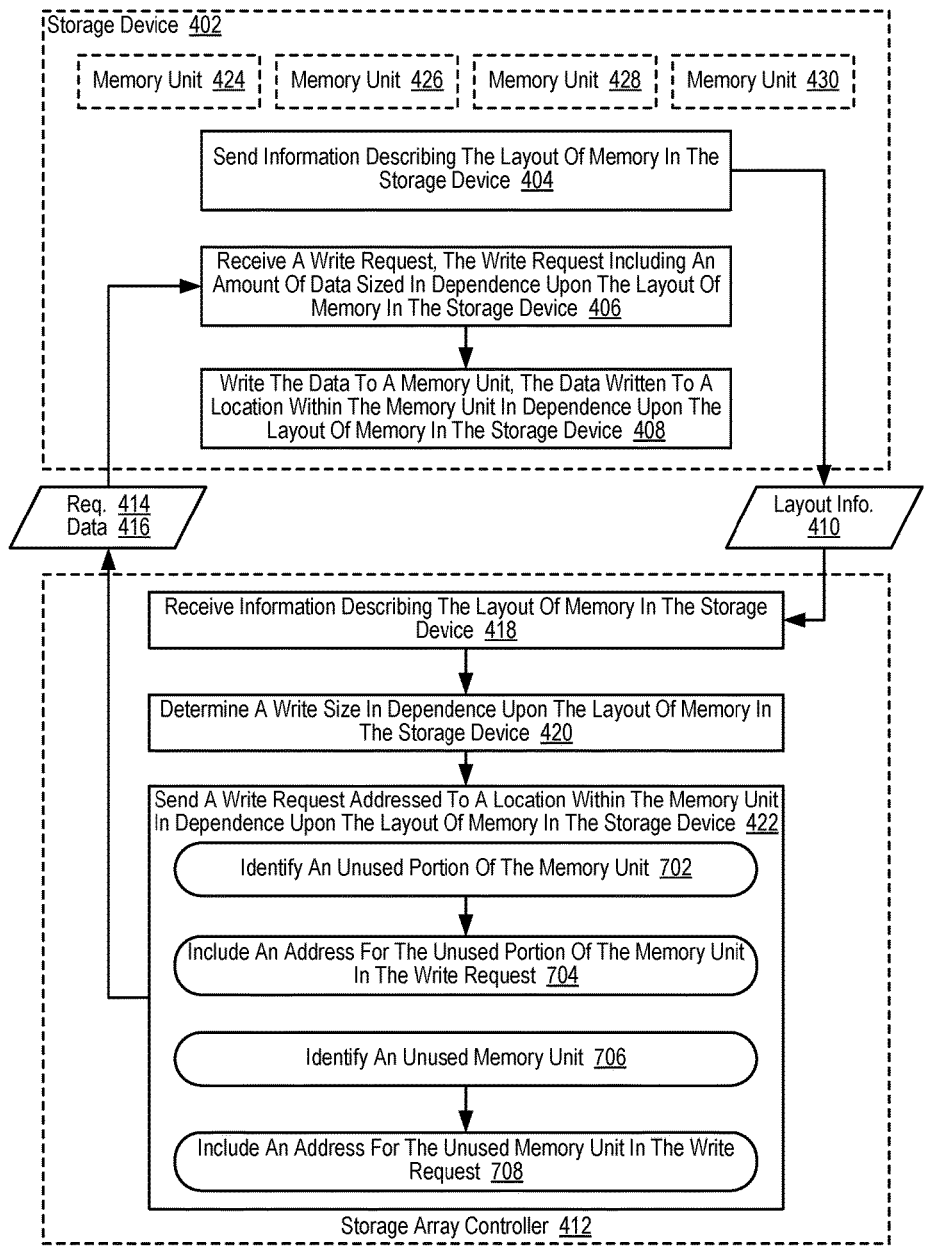
FIG. 7 sets forth a flow chart illustrating an additional example method of exposing a geometry of a storage device according to embodiments of the present disclosure.

For further explanation, FIG. 7 sets forth a flow chart illustrating an additional example method of exposing a geometry of a storage device (402) according to embodiments of the present disclosure. The example method depicted in FIG. 7 is similar to the example method depicted in FIG. 4, as the example method depicted in FIG. 7 also includes sending (404) information (410) describing the layout of memory in the storage device (402), receiving (418) the information (410) describing the layout of memory in the storage device (402), determining (420) a write size in dependence upon the layout of memory in the storage device (402), sending (422) a write request (414) addressed to a location within a memory unit (424, 426, 428, 430) in dependence upon the layout of memory in the storage device (402), receiving (406) the write request (414), and writing (408) the data (416) to a memory unit (424, 426, 428, 430) in dependence upon the layout of memory in the storage device (402).

In the example method depicted in FIG. 7, sending (422) a write request (414) addressed to a location within a memory unit (424, 426, 428, 430) in dependence upon the layout of memory in the storage device (402) can include identifying (702) an unused portion of the memory unit (424, 426, 428, 430). The unused portions of the memory unit (424, 426, 428, 430) may be embodied, for example, as empty pages within a block. For example, an 8 MB block may only include data stored in the pages that comprise the first 3 MB of the block, meaning that no data is stored in the pages that comprise the last 5 MB of the block. In such an example, writing (508) the data to an unused portion of the memory unit (424, 426, 428, 430) may therefore be carried out by writing data to some portion of the pages that comprise the last 5 MB of the block.

The storage array controller (412) of FIG. 7 may identify (702) the unused portion of the memory unit (424, 426, 428, 430), for example, by tracking which portions of the memory unit (424, 426, 428, 430) have been written to since the last time that the memory unit (424, 426, 428, 430) was erased. In such an example, the storage array controller (412) may be configured to direct write requests to contiguous portions of a memory unit (424, 426, 428, 430) until all portions of the memory unit (424, 426, 428, 430) have been written to since the last time that the memory unit (424, 426, 428, 430) was erased. For example, the storage array controller (412) may direct a first write request to a first portion (e.g., a first page) of the particular memory unit (424, 426, 428, 430), the storage array controller (412) may direct a second write request to a second portion (e.g., a second page) of the particular memory unit (424, 426, 428, 430), and so on.

In the example method depicted in FIG. 7, sending (422) a write request (414) addressed to a location within a memory unit (424, 426, 428, 430) in dependence upon the layout of memory in the storage device (402) can also include including (704) an address for the unused portion of the memory unit (424, 426, 428, 430) in the write request (414). The address for the unused portion of the memory unit (424, 426, 428, 430) in the write request (414) may be embodied, for example, as a logical address that is to be translated by the storage device (402) or, alternatively, as a physical address that requires no translation by the storage device (402).

In the example method depicted in FIG. 7, sending (422) a write request (414) addressed to a location within a memory unit (424, 426, 428, 430) in dependence upon the layout of memory in the storage device (402) can alternatively include identifying (706) an unused memory unit (424, 426, 428, 430). The unused memory unit (424, 426, 428, 430) may be embodied, for example, as an entire empty block. For example, an 8 MB block may have been recently subjected to an erase operation, meaning that no data is stored in the entire 8 MB block. In such an example, writing (510) the data to an unused memory unit (424, 426, 428, 430) may therefore be carried out by writing data to one or more pages within the block.

The storage array controller (412) of FIG. 7 may identify (706) the unused memory unit (424, 426, 428, 430), for example, by tracking which memory units (424, 426, 428, 430) have been written to since the last time that each memory unit (424, 426, 428, 430) was erased. In such an example, the storage array controller (412) may be configured to direct write requests to contiguous portions of a memory unit (424, 426, 428, 430) until all portions of the memory unit (424, 426, 428, 430) have been written to since the last time that the memory unit (424, 426, 428, 430) was erased. For example, the storage array controller (412) may direct a first write request to a first portion (e.g., a first page) of the particular memory unit (424, 426, 428, 430), the storage array controller (412) may direct a second write request to a second portion (e.g., a second page) of the particular memory unit (424, 426, 428, 430), and so on. In examples where the storage array controller (412) is tasked with writing an amount of data that is larger than the amount of free space in a partially used memory unit (424, 426, 428, 430), the storage array controller (412) may identify an entirely unused memory unit (424, 426, 428, 430) and begin directing write requests to the entirely unused memory unit (424, 426, 428, 430).

In the example method depicted in FIG. 7, sending (422) a write request (414) addressed to a location within a memory unit (424, 426, 428, 430) in dependence upon the layout of memory in the storage device (402) can also include including (708) an address for the unused memory unit (424, 426, 428, 430) in the write request (414). The address for the unused memory unit (424, 426, 428, 430) in the write request (414) may be embodied, for example, as a logical address that is to be translated by the storage device (402) or, alternatively, as a physical address that requires no translation by the storage device (402).

Readers will appreciate that although the examples depicted in the flowcharts included above illustrate examples where various steps are depicted as occurring in a certain order, such an ordering is not necessarily required according to embodiments of the present disclosure. In fact, a requirement that steps be performed in a certain order only exists where the performance of a particular step is described as occurring 'responsive to' the performance of another step. As such, the examples depicted above only illustrate specific embodiments of the present disclosure.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of exposing a geometry of a storage device, the method comprising:
   sending, by the storage device, information describing the layout of memory in the storage device to a storage array controller associated with the storage device, wherein the information describing the layout of the memory in the storage device comprises a physical addressing scheme of the storage device;
   receiving, by the storage device, a write request from the storage array controller, the write request associated with an amount of data sized in dependence upon the layout of memory in the storage device; and
   writing, by the storage device, the data to a memory unit, the data written to a location within the memory unit in dependence upon the physical addressing scheme of the storage device.

2. The method of claim 1 wherein the write request includes a physical address of the location in the storage device for storing the data.

3. The method of claim 1 wherein the information describing the layout of memory in the storage device includes information describing a size of a writeable memory unit in the storage device.

4. The method of claim 1 wherein the information describing the layout of memory in the storage device includes information describing a size of an erasable memory unit in the storage device.

5. The method of claim 1 wherein writing the data to the memory unit further comprises writing the data to an unused portion of the memory unit.

6. The method of claim 1 wherein writing the data to the memory unit further comprises writing the data to an unused memory unit.

7. A storage device, the storage device configured to:
send information describing the layout of memory in the storage device to a storage array controller associated with the storage device, wherein the information describing the layout of the memory in the storage device comprises a physical addressing scheme of the storage device;
receive a write request from the storage array controller, the write request associated with an amount of data sized in dependence upon the layout of memory in the storage device; and
write the data to a memory unit, the data written to a location within the memory unit in dependence upon the physical addressing scheme of the storage device.

8. The storage device of claim 7 wherein the write request includes the physical address of a location in the storage device for storing the data.

9. The storage device of claim 7 wherein the information describing the layout of memory in the storage device includes information describing a size of a writeable memory unit in the storage device.

10. The storage device of claim 7 wherein the information describing the layout of memory in the storage device includes information describing a size of an erasable memory unit in the storage device.

11. The storage device of claim 7 wherein to write the data to the memory unit the storage device is further to write the data to an unused portion of the memory unit.

12. The storage device of claim 7 wherein to write the data to the memory unit the storage device is further to write the data to an unused memory unit.

13. A non-transitory computer-readable storage medium having instructions stored thereon that when executed by a processing device of a storage device cause the processing device to:

send, by the processing device, information describing the layout of memory in the storage device to an array controller associated with the storage device, wherein the information describing the layout of the memory in the storage device comprises a physical addressing scheme of the storage device;
receive, by the processing device, a write request from the array controller, the write request associated with an amount of data sized in dependence upon the layout of memory in the storage device; and
write, by the processing device, the data to a memory unit, the data written to a location within the memory unit in dependence upon the physical addressing scheme of the storage device.

14. The non-transitory computer-readable storage medium of claim 13 wherein the write request includes the physical address of a location in the storage device for storing the data.

15. The non-transitory computer-readable storage medium of claim 13 wherein the information describing the layout of memory in the storage device includes information describing a size of a writeable memory unit in the storage device.

16. The non-transitory computer-readable storage medium of claim 13 wherein the information describing the layout of memory in the storage device includes information describing a size of an erasable memory unit in the storage device.

17. The non-transitory computer-readable storage medium of claim 13 wherein writing the data to the memory unit further comprises writing the data to an unused portion of the memory unit.

18. The non-transitory computer-readable storage medium of claim 13 wherein writing the data to the memory unit further comprises writing the data to an unused memory unit.

* * * * *